United States Patent

[11] 3,626,064

[72] Inventors George H. Hitchings
   Yonkers;
   Elvira A. Falco, New Rochelle, both of N.Y.
[21] Appl. No. 633,399
[22] Filed Apr. 25, 1967
[45] Patented Dec. 7, 1971
[73] Assignee Burroughs Wellcome & Co. (U.S.A.) Inc.
   Tuckahoe, N.Y.
[32] Priorities Aug. 10, 1955
[33] Great Britain
[31] 23,055/55;
   May 23, 1962, Great Britain, No.
   19,863/62; Aug. 23, 1962, Great Britain,
   No. 32,519/62
   Continuation-in-part of application Ser. No.
   574,576, Mar. 29, 1956, now abandoned,
   Continuation-in-part of application Ser. No.
   22,394, Apr. 15, 1960, now abandoned,
   Continuation-in-part of application Ser. No.
   221,357, Sept. 4, 1962, now abandoned,
   Continuation-in-part of application Ser. No.
   524,873, Feb. 3, 1966, now abandoned.
   This application Apr. 25, 1967, Ser. No.
   633,399

[54] TREATMENT OF HYPERURICEMA WITH 4-AMINO-6-HYDROXY-1-H-PYRAZOLO(3,4-D)PYRIMIDINE
   2 Claims, No Drawings
[52] U.S. Cl. .................................................... 424/251
[51] Int. Cl. .................................................... A61k 27/00
[50] Field of Search ........................................ 167/55 DE,
   55 OK, 65 IN; 424/251

[56] References Cited
OTHER REFERENCES
Elion et al., Cancer Chemotherapy Reports, No. 16, Feb. 1962, pp. 197– 202 (Copy in P.O.S.C.)

*Primary Examiner*—Jerome D. Goldberg
*Attorney*—Dike, Thompson & Bronstein

ABSTRACT: The method of treatment and prophylaxis for hyperuricemia, which comprises administering to a mammal a therapeutically effective amount of a compound 4-amino-6-hydroxy-1-H-pyrazolo(3,4-d)pyrimidine.

TREATMENT OF HYPERURICEMA WITH 4-AMINO-6-HYDROXY-1-H-PYRAZOLO(3,4-D)PYRIMIDINE

This invention relates to a method of treatment and prophylaxis for hyperuricemia in mammals. This is a continuation-in-part of our applications Ser. No. 574,576 filed Mar. 29, 1956, now abandoned; Ser. No. 22,394 filed Apr. 15, 1960, now abandoned; Ser. No. 221,357 filed Sept. 4, 1962, now abandoned; and Ser. No. 524,873 filed Feb. 3, 1966, now abandoned.

The compounds of the present invention comprise pyrazolo(3,4-d)pyrimidines of the general formula:

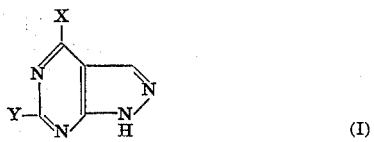

wherein X is amino and Y is hydroxyl and tautomers of these compounds.

Hyperuricemias, both primary and secondary, are associated with gout and uric acid lithiasis of the kidney and related complications.

It is apparent, therefore, that an inhibition of xanthine oxidase activity in vivo is useful in reducing the metabolic production of uric acid, thereby providing a method of treating hyperuricemia.

In the mongrel dog, the end product of purine metabolism is allantoin, which is formed from uric acid by the enzyme uricase. Decreases in uric acid production are therefore seen in the dog as a decrease in the production of allantoin.

The compound may thus advantageously be presented in discreet units such as tablet, capsules, cachets, ampuls or suppositories, each containing a predetermined amount of xanthine oxidase inhibitor. The active ingredients may also be presented in a powder or granules, as a solution or suspension in an aqueous, nonaqueous or emulsified liquid. For parenteral use, the formulations must be sterile and are presented in sealed containers. The formulations of this invention may be made by any of the methods of pharmacy and may include on or more of the following accessory ingredients: diluents, solutes, buffers, flavoring binding, dispersing, surface-active, thickening, lubricating and coating materials, preservatives, antioxidants, bacteriostats, suppository and ointment bases, and any other acceptable excipients. A preferred form is a compressed tablet containing 100 mg. of the active ingredient with about 350 mg. of lactose and suitable granulating and lubricating materials.

The present invention, therefore, comprises the treatment and prophylaxis for hyperuricemia by administration of 4-amino-6-hydroxypyrazolo(3,4-d)pyrimidine to a mammal. The dosage administered is preferably 2 to 30 mg./kg. of body weight per day.

The invention will now be described with reference to the following examples, in which all temperatures are given in degrees Centigrade.

EXAMPLE 1

Preparation of 4-mercapto-6-hydroxy-1-pyrazolo(3,4-d)pyrimidine

To 4 g. of the 4,6-dihydroxy compound there was added 12 g. of phosphorus pentasulfide and 60 ml. of dry pyridine. This mixture was heated for 3 hours at reflux temperature. The pyridine was removed in vacuo and the residue taken up in cold dilute sodium hydroxide solution. On acidification, there was obtained 3.5 g. of a pale yellow compound. This compound, after crystallization from boiling water, formed yellow plates which do not melt at 360°. This compound had the following u.v. adsorption spectrum: at pH 1 the maxima are at 255 and 330 m$\mu$, while at pH 11 the peaks are at 255 and 330 m$\mu$.

EXAMPLE 2

4-Amino-6-hydroxy-1-pyrazolo(3,4-d)pyrimidine

To 1.5 g. of the 4-mercapto-6-hydroxy compound described above, there was added 200 ml. of alcohol saturated with ammonia at 0°. This mixture was heated in a closed vessel for 72 hours at 143°. The bomb contents were allowed to evaporate to dryness, and the residue was taken up in cold 1-N hydrochloric acid, and precipitated with dilute ammonium hydroxide solution at about pH 7. This was repeated twice more to yield 650 mg. of colorless powder which does not melt at 360°.

What is claimed is:

1. The method of treatment and prophylaxis for hyperuricemia in mammals, which comprises administering to said mammal a therapeutically effective amount of 4-amino-6-hydroxy-1-H-pyrazolo(3,4-d)pyrimidine.

2. The method of claim 1, wherein the compound 4-amino-6-hydroxy-1-H-pyrazolo(3,4-d)pyrimidine is administered at a dosage of 2 to 30 mg./kg. of the body weight of the mammal treated.

* * * * *